INVENTOR.
WILLIAM B. LURIE

United States Patent Office 3,192,523
Patented June 29, 1965

3,192,523
DOPPLER NAVIGATOR LAND-WATER
CORRECTOR
William B. Lurie, New Rochelle, N.Y., assignor to
General Precision, Inc., a corporation of Delaware
Filed Feb. 11, 1960, Ser. No. 8,127
10 Claims. (Cl. 343—8)

This invention relates to airborne navigation instruments employing Doppler echo information, and more specifically to a component in such instruments for detecting and correcting errors due to echoes from water surfaces.

Doppler navigation instruments for aircraft employ several narrow beams of microwave radiation directed obliquely toward the earth. The aircraft's speed and drift angle can be found by measurement of the Doppler frequencies in the microwave energy reflected from the earth to the aircraft. When the aircraft's speed changes, the received Doppler frequencies change proportionately. That part of the microwave receiver which measures the Doppler frequency must therefore be designed to lock to the incoming frequency and to track it as it changes. This component of the receiver is termed the frequency tracker. It can be designed to measure the center frequency of the Doppler spectrum with high accuracy.

The calibration constant of the frequency tracker is defined as the ratio of the measured Doppler spectrum center frequency to the aircraft's speed. For a given instrument as installed this ratio is constant at any speed when the microwave beam reflection is from land. However, when the reflection is from water the ratio is reduced by an amount of perhaps 1½%, which is far greater than the normal error of the instrument over land. It therefore becomes important to correct this water reflection error.

The amount of water reflection error depends on the state of the water surface, including its degree of roughness or smoothness. Therefore, although a manual change in the calibration constant may be made when a coast line is crossed, this is obviously not a complete solution of the problem.

One purpose of this invention is to provide automatic means to correct the water reflection error.

Another purpose of this invention is to provide means for detecting a water surface beneath the aircraft.

Still another purpose of this invention is to provide means for detecting water beneath the aircraft and for automatically correcting the error produced by water reflection.

One example of a microwave beam used in an aircraft Doppler navigation instrument employs microwave energy at 8800 mcps. directed as a 4° cone downward and forward from the aircraft toward its ground track at an incident angle of 28°.

The general relation between the Doppler shift frequency, $f_d$, in the microwave echo in any element of an oblique beam and the angle of incidence at the earth, $\psi$, is $$f_d = \frac{2V}{\lambda} \cos \psi, \tan \phi \qquad (1)$$

in which V is the aircraft speed, $\lambda$ is the wavelength, and $\phi$ is the angle of incidence at the ground of the projection of the beam on a vertical plane through the ground track of the aircraft. The transmitting amplitude across the beam varies in a Gaussian manner to a first approximation, but the receiving amplitude distribution forms a slightly skewed Gaussian characteristic because the beam elements at the larger incident angles are longer and therefore suffer more attenuation. Since these elements return higher frequency Doppler information, in accordance with Equation 1, the power density versus frequency characteristic is slightly skewed, with its average frequency slightly displaced toward the lower frequencies.

It has been found that the amount of microwave energy backscattered toward the source depends on the terrain. Backscattering from land is almost completely isotropic at all angles of incidence, so that the amount of energy received at the aircraft is almost independent of the angle.

This is not true when the microwave beam energy is reflected back to the source from a water surface. In this case the amount of energy backscattered depends both on the nature of the surface and on the angle of incidence. Rough water backscatters more than smooth, and much more is backscattered at small angles of incidence than at large.

Specifically, at incident angles of greatest interest in Doppler navigational instruments, say between 25° and 35°, the energy return from water decreases rapidly as the angle of incidence is increased. This change with angle in energy return from water is so great that even within a 4° beam width it is marked, and results in a power density versus frequency characteristic which is badly distorted, so that the center frequency as found by a frequency tracker is between ¾% and 1½% lower than it would be at the same speed over land.

The present invention detects this surface reflection difference, and if the surface is water it introduces a correction, while if the surface is land the invention introduces no correction. The invention does this by alternating the beam between two positions having incident angles differing by some angle, of which 3° would be typical. This alternation of the beam is effected at some appropriate rate, perhaps less than 100 cps. The amplitudes of the signal returns in the two beam positions are substantially equal in land reflection, but are markedly unequal in water reflection. This inequality is detected, preferably in the receiver intermediate amplifier, and a signal is secured which alternates at the position alternation rate. This signal, which is secured only in overwater operation, is caused to operate a switch or a potentiometer to change the instrument calibration constant, either stepwise or proportionately, so that the frequency tracker output is what it would be if the aircraft beam were reflected from land instead of water.

A further understanding of this invention may be secured from the detailed description and drawings, in which.

Figure 1:
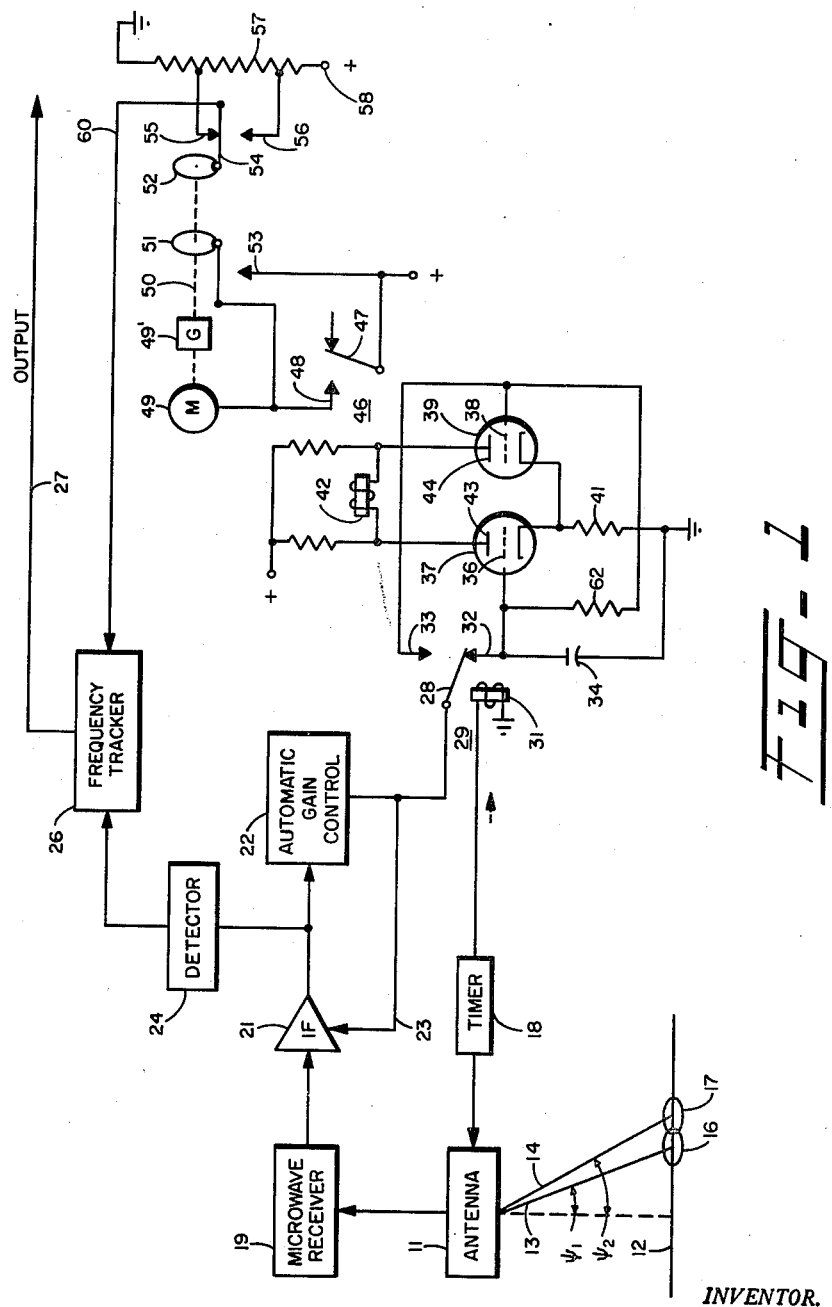
FIGURE 1 is a schematic circuit of one embodiment of the invention.

Referring now to FIGURE 1, a microwave antenna 11 is mounted on an aircraft whose ground track projected on the earth is indicated by the line 12. The antenna 11 alternately emits two beams of microwave energy, their center elements being indicated by the lines 13 and 14. These beams strike the ground track forward of the aircraft in the areas 16 and 17, the angles of incidence of the center elements of the beams being $\psi_1$ and $\psi_2$. These angles may be, for example, 25° and 28½°, and the beam widths may each be 4°. The alternation of the antenna beams is controlled by a timer 18.

The beam returns containing Doppler information are applied to a microwave receiver 19, where they are demodulated to an intermediate frequency of 30 mc. p.s. The signals are amplified at this frequency in an intermediate frequency amplifier 21. This amplifier is gain controlled in a conventional automatic gain control circuit 22 which rectifies a portion of the 30-mc. p.s. signal to direct current having an amplitude proportional to the signal amplitude, and feeds the control signal back through conductor 23 in such a way as to control the amplifier gain in inverse proportion to the control signal amplitude. The intermediate amplifier output is demodulated in a detector 24 to secure a signal containing Doppler frequencies, and this signal is applied to a frequency tracker 26. The frequency tracker finds the center frequency of the Doppler spectrum or spectrums, locks thereto, and emits on conductor 27 a potential having a single frequency representative thereof.

Such an antenna, microwave receiver, frequency tracker and associated components are described in U.S. patent application Serial No. 718,376, filed February 28, 1958.

The control signal conductor 23 is additionally connected to the arm 28 of a relay 29 having its solenoid 31 conected for operation by the timer 18. This relay arm 28 is thus provided with direct potential which is proportional to the intermediate frequency signal amplitude. It is not essential to employ the automatic gain control conductor for this purpose. In some cases it may be preferable to employ a separate rectifier solely for the purpose of furnishing a rectified intermediate frequency signal to the arm 28.

The arm 28 operates between two fixed contacts, 32 and 33. Contact 32 is connected to a capacitor, 34, the other terminal of which is grounded. Contact 32 is also connected to the control grid 36 of an electron tube 37. The other contact 33 is connected to the control grid 38 of a second electron tube 39. These two tubes comprise a differential amplifier having a common cathode resistor 41. The coil 42 of a relay 46 is connected between the anodes 43 and 44 of the differential amplifier. The coil 42 actuates an arm 47 connected to a potential supply. The fixed relay contact 48 is connected to a motor 49 comprising a cyclical timer. The motor drives a step-down gear 49′ which rotates the shaft 50 slowly, for example, at one revolution per minute. The shaft 50 carries two similar cams 51 and 52. Each is circular with a single indentation. The cam 51 is provided with a follower closing a contact 53 except when the follower is in the indentation. The cam 52 operates its follower and contact arm 54 from contact 55 to contact 56 when the follower leaves the indentation, where the arm remains except when the follower is in the indentation. These contacts are connected to two taps of a resistor 57 energized by a source of potential 58. The arm 54 is connected through conductor 60 to the frequency tracker 26 in such a way as to apply thereto potential controlling its calibration constant.

Figure 2:
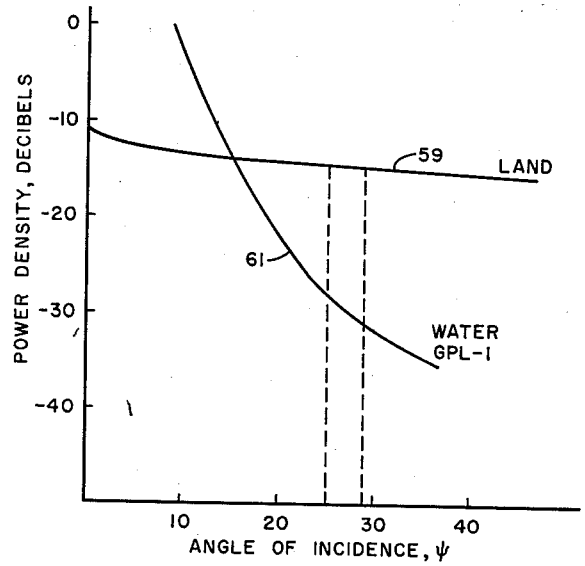
FIGURE 2 depicts backscattering properties of land and water for x-band microwaves at varying incidence angles.

FIGURE 2 illustrates in graph 59 the small variation with angle of incidence of the intensity of land backscatter. Graph 61 illustrates the large variation of backscatter intensity from a water surface of moderate roughness characterized as GPL-1, approximately corresponding to 1 on the Beaufort wind scale. These graphs show that the backscatter energies from a land target at $\psi=25°$ and $\psi=28½°$ are not materially different, while the backscatter energies from a water target at these angles.

In the operation of the circuit of FIGURE 1, the timer 18 is designed to beam the microwave energy in one of the beams, 13 or 14, for most of the time, and to transfer the energy to the beam in the other direction only for a small fraction of the time as a test of the nature of the terrain below the aircraft. The rate of alternation must be low enough so that the minimum period of dwell in either direction is materially greater than the time constant of the automatic gain control circuit 22, or of an alternative rectifying or detecting circuit which may be substituted for circuit 22. As an example, the timer is arranged so that the antenna emits beam 13 at an angle $\psi_1$ for 59 seconds, then emits beam 14 at an angle $\psi_2$ for 1 second, and repeats this cycle.

The timer is also connected to relay 29 so that the relay dwells on its contact 32 during the 59 seconds of operation of beam 13, and dwells on its other contact 33 during the 1-second operation of beam 14.

Let it be supposed that the aircraft beams are reflected from water. Then, in accordance with graph 61 of FIGURE 2, the intensities of the signals received from beams 13 and 14 will differ by more than 2 db, those from beam 14 being weaker. During the reception from beam 13, when relay 29 dwells on contact 32, direct current charges capacitor 34 to a potential representative of the intensity of the beam 13 signal. This potential is applied to the control grids 36 and 38 equally through the equalizing resistor 62, so that the differential relay 46 remains unoperated. When the timer transfers reception to beam 14 and simultaneously transfers relay arm 28 to contact 33, a signal of much less amplitude is applied to control grid 38. Meanwhile, the large charged capacitor 34 maintains its charge and thus maintains its potential on control grid 36. Thus grid 36 is maintained at a selected negative potential but during this 1-second period a lesser negative potential is applied to grid 38. This causes more anode current to flow in tube 39 than in tube 37, so that current flows through the relay coil 42 from anode 43 to anode 44. This operates the arm 47, closing contact 48 and applying potential to the cycle timer motor 49. The motor starts. When the cam 51 lifts its follower from the indentation contacts 53 close, shunting contacts 47/48 and insuring the continuance of motor operation for one revolution of the shaft 50. When the cam 52 lifts its follower from the indentation, the contact arm 54 is transferred from contact 55 to contact 56, thus changing the potential applied through conductor 60 to the frequency tracker 26 in such a way as to increase its calibration constant about 1%, thus increasing its output frequency by that amount. At the end of about 58 seconds the timer cam followers return to their indentations, restoring the contacts and stopping the motor, so that the timer is ready for the next 1-second test period. This action also returns the calibration constant of the frequency tracker 26 to its normal, or overland, value. This restoring action takes place just before, or at the start of, the next 1-second beaming period. The cycle is now repeated if the aircraft beams are still reflected from water.

If, on the other hand, the aircraft beams are reflected from land, the intensities of the signals received from the beams 13 and 14 are substantially equal as shown by graph 59, FIGURE 2. Then after the capacitor 34 has been charged, when the signal representing the return from beam 14 is applied to contact 33 it is of the same intensity as the potential applied by capacitor 34 to grid 36. The differential stage anodes therefore remain at the same potential and relay 46 does not operate. Therefore the calibration constant of the frequency tracker 26 remains at its normal value for overland operation.

Since the effect of overwater operation as measured by the slope of curve 61, FIGURE 2, depends on several factors such as the roughness of the water surface, it may be desired to control the calibration constant of the frequency tracker proportionally to the difference in the signal intensities of the two beams.

Figure 3:
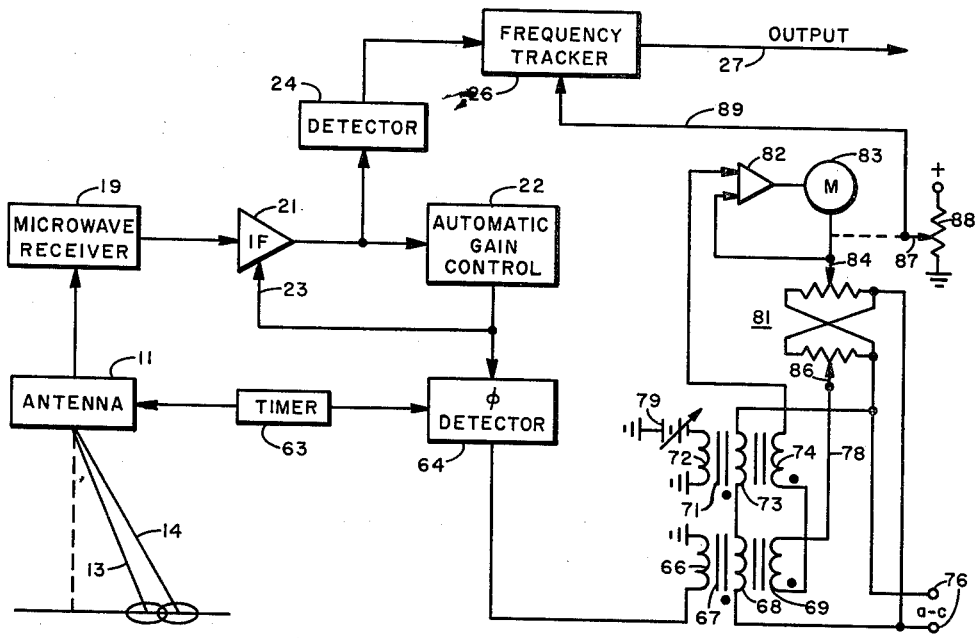
FIGURE 3 is a schematic circuit of another embodiment of the invention providing proportional correction of the calibration constant.

One of the ways in which this can be done is shown in FIGURE 3. The timer 63 emits a square wave having a period longer than the time constant of the automatic gain control circuit 22, the timer frequency being, for example, 5 c.p.s. The timer 63 controls the alternations of the beams 13 and 14 and also serves as phase reference for a phase detector 64 securing its signal from the negative potential output of the automatic gain control circuit 22 at conductor 23. The direct-current error signal output of the phase detector 64 is applied to the control winding 66 of a saturable transformer 67 having also a primary winding 68 and a secondary winding 69. A second, similar saturable transformer 71 has a control winding 72, primary winding 73 and secondary winding 74.

The primary windings 68 and 73 are connected in series aiding to a source 76 of alternating current. The secondary windings are connected in series opposed to conductors 77 and 78, and the control winding 72 is connected to a biasing potential battery 79 for adjustment of the zero point. Such a saturable transformer combination is sometimes termed a saturable modulator or magnetic amplifier. Conductors 77 and 78 are connected in series with an adjustable potentiometer 81 supplied with alternating potential and to the input of an amplifier 82. The amplifier 82 is connected to operate a motor 83 connected to the sliders 84 and 86 of potentiometer 81. The motor shaft is also connected to adjust the slider 87 of a potentiometer 88 to vary the potential applied through conductor 89 to the frequency tracker 26 in such a manner as to vary its calibration constant.

In operation over land, the automatic gain control signal in conductor 23 is constant during both half-cycles of 5 c.p.s. timer signal, so that the phase detector 64 emits no signal output and no current flows in the control winding 66. The transformer output conductors 77 and 78 are therefore at approximately zero potential, depending on the setting of battery 79, and the motor sets the sliders 84 and 86 at a null which is approximately at zero output voltage, with a concomitant setting of potentiometer 88. This setting applies such potential through conductor 89 as to cause the frequency tracker 26 calibration constant to have its normal overland value.

In operation over water, the automatic gain control signal in conductor 23 has different values in the two halves of the 5 c.p.s. period, because it is proportional to the signal returns in the two beams 13 and 14, which differ in about the ratio of 3 to 2. A direct-potential error signal output representative of the magnitude of this difference is therefore emitted by the phase detector and is applied to the control winding 66. This unbalances the saturable transformers and produces a potential difference between conductors 77 and 78. This operates the motor 83 which, in restoring the potential in the loop to zero null, moves slider 87 thus changing the potential applied through conductor 89 and changing the frequency tracker calibration constant. The change is upward by an amount proportional to the difference in intensities of the beam returns, thus exactly neutralizing the amount of error causes by the reflection from water.

What is claimed is:

1. A land-water corrector for an airborne Doppler navigational system comprising, microwave means in said system radiating two beams alternately toward the earth and generating from the echo signals thereof two direct-current signal amplitudes representative of the amplitudes of said echo signals, a frequency tracker operated by said echo signals, means securing a difference signal from said two direct-current signals, and means revising said frequency tracker output in accordance with said difference signal.

2. A land-water corrector for an airborne Doppler navigational system comprising, means in said system radiating two micro-wave beams in alternation in different directions toward the earth whereby echo signals caused by land or water backscattering are received in said system, a frequency tracker in said system tracking the Doppler frequencies in said echo signals, means generating from said echo signals two direct-current signal amplitudes representative of the amplitudes of said echo signals, means deriving a correction signal from said two direct-current signals representing the difference of said direct-current signals, and means revising the output of said frequency tracker in accordance with the amplitude of said correction signal.

3. A land-water corrector for an airborne Doppler navigational system comprising, means in said system radiating two microwave beams in alternation toward the earth at different angles of incidence whereby echo signals caused by land or water backscattering are received in said system, means generating intermediate frequency signals from said echo signals having amplitudes representative of said echo signals, means deriving Doppler frequency spectra from said intermediate frequency signals, a frequency tracker tracking the median frequencies of said Doppler frequency spectra, means generating from said intermediate frequency signals two direct-current signal amplitudes representative thereof, means deriving a correction signal from said two direct-current signals representative of the difference thereof, and automatic means applying said correction signal to said frequency tracker to revise the output of said frequency tracker in overwater operation.

4. A land-water corrector comprising, an airborne Doppler navigational system including means radiating two microwave beams in alternation toward the earth, said beams striking the target at angles of incidence which are sufficiently different to cause substantial difference in the echo amplitudes of said two beams scattered back to the aircraft from water area whereas back-scatterings from land areas have no substantial amplitude difference, means demodulating said echoes to form two intermediate frequency signals having amplitudes proportional to said two echo amplitudes, a frequency tracker in said system actuated in accordance with functions of said intermediate frequency signals, means rectifying said two intermediate frequency signals to form two direct-current signals representative thereof, means deriving a correction signal from said two direct-current signals representative of the difference thereof, and automatic means applying said correction signal to said frequency tracker to revise the output of said frequency tracker in overwater operation.

5. A land-water corrector comprising, an airborne Doppler navigational system, a microwave transmitter therein radiating two beams in alternation toward the earth, said beams striking the earth at different angles of incidence whereby a substantial difference in the back-scattered echo energy amplitudes is produced when the target is a water area while backscattering amplitudes from land areas have no substantial amplitude difference, a microwave receiver in said system demodulating said echo energies to form two intermediate frequency signals having amplitudes proportional to said echo amplitudes, a demodulator deriving Doppler frequency signals from said two intermediate amplifier signals, a frequency tracker in said system tracking said Doppler frequency signals, a rectifier securing from said two intermediate frequency signals two direct-current signals representative thereof, demodulating means deriving a correction signal from said two direct-current signals representative of the difference of the amplitudes thereof, and automatic means applying said correction signal to said frequency tracker to revise the output of said frequency tracker in over-water operation.

6. A land-water corrector in accordance with claim 5 in which said rectifier is part of an automatic gain control circuit.

7. A land-water corrector for an airborne Doppler navigational system comprising, microwave means in said system radiating two beams alternately toward the earth and generating from the echo signals thereof two direct-current signal amplitudes representative of the amplitudes of said echo signals, a frequency tracker operated by said echo signals, a relay, means operating said relay in synchronism with the alternations of said two beams, means applying said two direct-current signals to said relay, means securing from said relay a signal representing the difference of said two direct-current signals, and means applying said difference signal to said frequency tracker to revise the output thereof.

8. A land-water corrector comprising, an airborne Doppler navigational system, a microwave transmitter therein radiating two beams in alternation toward the earth, said beams striking the earth at different angles of incidence whereby a substantial difference in the backscattered echo energy amplitudes is caused when the target is a water area while backscattering amplitudes from land areas have no substantial difference, a microwave receiver in said system demodulating said echo energies to form two intermediate frequency signals having amplitudes proportional to said echo amplitudes, a demodulator deriving Doppler frequency signals from said two intermediate amplifier signals, a frequency tracker in said system tracking said Doppler frequency signals, a rectifier securing from said two intermediate frequency signals two direct-current signals representative thereof, an electromagnetic relay having said two direct-current signals impressed on a movable contact arm thereof, means operating said relay in synchronism with the alternations of said two beams, connections from fixed contacts of said relay to the inputs of a differential amplifier, a second relay differentially operated by the output of said differential amplifier and having a normally open contact, a cyclical timer connected to said contact, and means operated through said cyclical timer for revising the output of said frequency tracker.

9. A land-water corrector for an airborne Doppler navigational system comprising, microwave means in said system radiating two beams alternately toward the earth and generating from the echo signals thereof two direct-current signal amplitudes representative of the amplitudes of said echo signals, a frequency tracker operated by said echo signals, a phase detector having said two direct-current signals impressed thereon in alternation, means applying a phase reference signal to said phase detector in phase with the alternations of said two beams whereby a direct-current signal is generated representative of the difference in amplitudes of said two echo signals, saturable modulator means having said direct-current signal impressed thereon and emitting an alternating current signal representative thereof, position servomechanism means actuated by said alternating current signal emitting a direct-current signal amplitude representative thereof, and means applying said direct-current signal amplitude to said frequency tracker to control the output thereof.

10. A land-water corrector for an airborne Doppler navigational system comprising, microwave means in said system radiating two beams alternately toward the earth and generating from the echo signals thereof two direct-current signal amplitudes representative of the amplitudes of said echo signals, a frequency tracker operated by said echo signals, a phase detector having said two direct-current signals impressed thereon in alternation, means applying a phase reference signal to said phase detector in phase with the alternations of said two beams whereby a direct-current signal is generated representative of the difference in amplitudes of said two echo signals, position servomechanism means actuated by said signal and means operated by said position servomechanism for revising the output of said frequency tracker.

No references cited.

CHESTER L. JUSTUS, *Primary Examiner.*

FREDERICK M. STRADER, *Examiner.*